United States Patent
Iida et al.

(10) Patent No.: US 12,472,887 B2
(45) Date of Patent: Nov. 18, 2025

(54) WIRE HARNESS

(71) Applicant: SUMITOMO WIRING SYSTEMS, LTD., Yokkaichi (JP)

(72) Inventors: Tetsuya Iida, Yokkaichi (JP); Takeru Miyamoto, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 154 days.

(21) Appl. No.: 18/261,839

(22) PCT Filed: Jan. 19, 2022

(86) PCT No.: PCT/JP2022/001850
§ 371 (c)(1),
(2) Date: Jul. 18, 2023

(87) PCT Pub. No.: WO2022/158495
PCT Pub. Date: Jul. 28, 2022

(65) Prior Publication Data
US 2024/0075888 A1    Mar. 7, 2024

(30) Foreign Application Priority Data
Jan. 20, 2021    (JP) .................................. 2021-007210

(51) Int. Cl.
*B60R 16/02*    (2006.01)

(52) U.S. Cl.
CPC ................................ *B60R 16/0207* (2013.01)

(58) Field of Classification Search
CPC ............ B60R 16/0207; B60R 16/0215; H01B 7/0045; H01R 13/405; H01R 13/6581; H01R 13/64; H01R 13/6593; H01R 13/65912; H01R 2201/26; H01R 11/12
See application file for complete search history.

(56) References Cited

U.S. PATENT DOCUMENTS

| | | | |
|---|---|---|---|
| 5,867,086 A | 2/1999 | Murata et al. | |
| 2011/0104924 A1* | 5/2011 | Matsuoka | H01R 13/707 439/271 |
| 2015/0050833 A1* | 2/2015 | Mizutani | B60L 50/16 439/527 |
| 2015/0333435 A1 | 11/2015 | Arai et al. | |

(Continued)

FOREIGN PATENT DOCUMENTS

| | | |
|---|---|---|
| JP | 2009289598 A | 12/2009 |
| JP | 2011100612 A | 5/2011 |
| JP | 2016219207 A | 12/2016 |

*Primary Examiner* — Paresh Paghadal (57) ABSTRACT

A wire harness according to one aspect of the present disclosure includes terminals arranged next to each other; electric wires respectively connected to the terminals; a resin housing including a hood and a holder; and a plate projecting out of the housing from the outer surface of the hood. The plate is partially embedded in the housing. The plate includes a pass-through portion extending through the plate in a thickness direction of the plate, and the pass-through portion is a hole or a slot. The holder includes a first part located on one side of the plate and incorporating the electric wires, a second part located on a side of the plate opposite to the one side of the plate, and a connecting portion that extends through the pass-through portion and connects the first part and the second part.

5 Claims, 4 Drawing Sheets

(56) References Cited

U.S. PATENT DOCUMENTS

| | | | |
|---|---|---|---|
| 2016/0255750 A1* | 9/2016 | Yoshida | H01B 7/04 |
| | | | 174/359 |
| 2018/0316142 A1 | 11/2018 | Yokotani | |
| 2018/0366866 A1* | 12/2018 | Yokotani | H01R 13/74 |
| 2019/0109406 A1* | 4/2019 | Wakimoto | H01R 13/46 |
| 2021/0210889 A1* | 7/2021 | Miyamoto | H01R 9/24 |

* cited by examiner

WIRE HARNESS

BACKGROUND

Field of the Disclosure

The present disclosure relates to a wire harness.

Related Art

A known wire harness electrically connects vehicle devices (for example, Japanese Laid-Open Patent Publication No. 2017-92418). Japanese Laid-Open Patent Publication No. 2017-92418 discloses a wire harness that includes terminals arranged next to one another, electric wires connected to the terminals, a housing holding the terminals and the electric wires, and a plate provided integrated with the housing.

The housing includes a tubular hood including an opening, in which the terminals are exposed, and electric wire holders, from which the electric wires extend. Each of the electric wire holders projects out of the hood from the outer surface of the hood.

The plate projects out of the housing around the entire periphery of the hood. The plate is held in a thickness direction by the housing. The plate is attached to a case of the device to attach the wire harness to the device.

To lay out such a wire harness, for example, the electric wires extending out of the electric wire holders may be bent in the thickness direction of the plate. This may produce a load that acts to separate the electric wire holders from the plate. In this case, separation of the housing from the plate will form a gap between the housing and the plate. This will limit the layout of the electric wires to an area that will avoid formation of such a gap.

It is an objective of the present disclosure to provide a wire harness that increases the degree of freedom for the layout of electric wires.

SUMMARY

A wire harness of the present disclosure includes terminals arranged next to each other, electric wires respectively connected to the terminals, a resin housing including a hood including an opening that exposes the terminals therein and a holder projecting out of the hood from an outer surface of the hood and holding the terminals and the electric wires, and a plate projecting out of the housing from the outer surface of the hood. The plate is partially embedded in the housing and includes a pass-through portion extending through the plate in a thickness direction of the plate. The pass-through portion is a hole or a slot. The holder includes a first part located on one side of the plate and incorporating the electric wires, a second part located on a side opposite to the one side of the plate, and a connecting portion that extends through the pass-through portion and connects the first part and the second part.

The present disclosure increases the degree of freedom for the layout of electric wires.

DETAILED DESCRIPTION

Description of Embodiments of the Present Disclosure

Embodiments of the present disclosure will first be described.

[1] A wire harness of the present disclosure includes terminals arranged next to each other, electric wires respectively connected to the terminals, a resin housing including a hood including an opening that exposes the terminals therein and a holder projecting out of the hood from an outer surface of the hood and holding the terminals and the electric wires, and a plate projecting out of the housing from the outer surface of the hood. The plate is partially embedded in the housing and includes a pass-through portion extending through the plate in a thickness direction of the plate. The pass-through portion is a hole or a slot. The holder includes a first part located on one side of the plate and incorporating the electric wires, a second part located on a side opposite to the one side of the plate, and a connecting portion that extends through the pass-through portion and connects the first part and the second part.

With such a structure, the connecting portion of the holder connects the first part and the second part, which hold the plate of the holder. This avoids the formation of a gap between the first part and the plate if a load acts on the first part when laying out the electric wires. Thus, the degree of freedom for the layout of the electric wires can be increased.

[2] Preferably, when a direction in which the terminals are arranged next to each other is referred to as an arrangement direction, the pass-through portion is one of a plurality of pass-through portions of the plate that are spaced apart from each other in the arrangement direction, and the connecting portion is one of a plurality of connecting portions of the holder that are spaced apart from each other in the arrangement direction.

With such a structure, the connecting portions and the holes, or the connecting portions and the pass-through portions, are spaced apart from each other in the arrangement direction. This avoids the formation of a gap between the first part of the holder and the plate over a wide area.

[3] Preferably, when a direction in which the holder projects is simply referred to as a projecting direction, the connecting portion is located closer to a distal end of the second part in the projecting direction than an intermediate portion between a basal end of the second part in the projecting direction and the distal end of the second part.

A load acting on the first part of the holder when laying out the electric wires will tend to be concentrated to a distal end side in the projecting direction of the holder. Thus, a gap will be easily formed at the distal end of the first part between the distal end and the plate.

In this regard, with the structure described above, the connecting portion is located closer to the distal end than the intermediate portion of the second part. More specifically, the first part and the second part are connected to each other by the connecting portion in the distal end side in the projecting direction of the holder. The connecting portion can be located close to the distal end in the first part by increasing the length from the basal end of the second part to the distal end. This avoids the shortcoming described above. Thus, the degree of freedom for the layout of the electric wires can be further increased.

[4] Preferably, a portion of each of the electric wires extending outward from the holder has a length of 30 mm or greater and 100 mm or less.

This structure allows the wire harness to connect connection subjects that are arranged close to each other.

Detail of Embodiment of Present Disclosure

A specific example of a wire harness of the present disclosure will now be described with reference to the drawings. In the drawings, elements are illustrated for simplicity and have not necessarily been drawn to scale. The present disclosure is not limited to these examples. The scope of the present disclosure and equivalence of the present disclosure are to be understood with reference to the appended claims. In the present specification, the term of "orthogonal" does not mean strictly orthogonal and may also mean substantially orthogonal so as to cover a scope that results in the same advantages as the present embodiment.

Structure of Wire Harness 10

Figure 1:
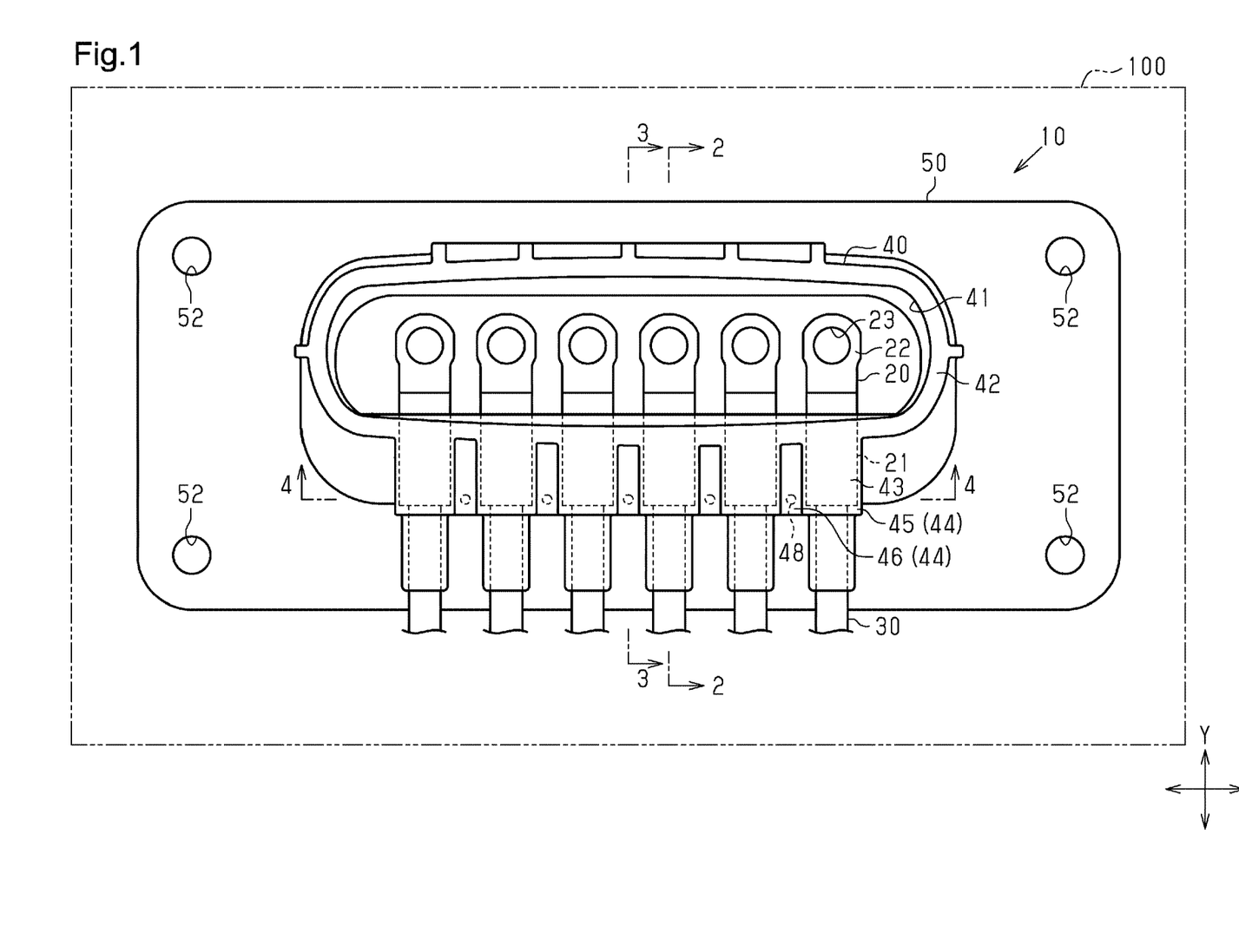
FIG. 1 is a plan view showing one embodiment of a wire harness.
Figure 2:
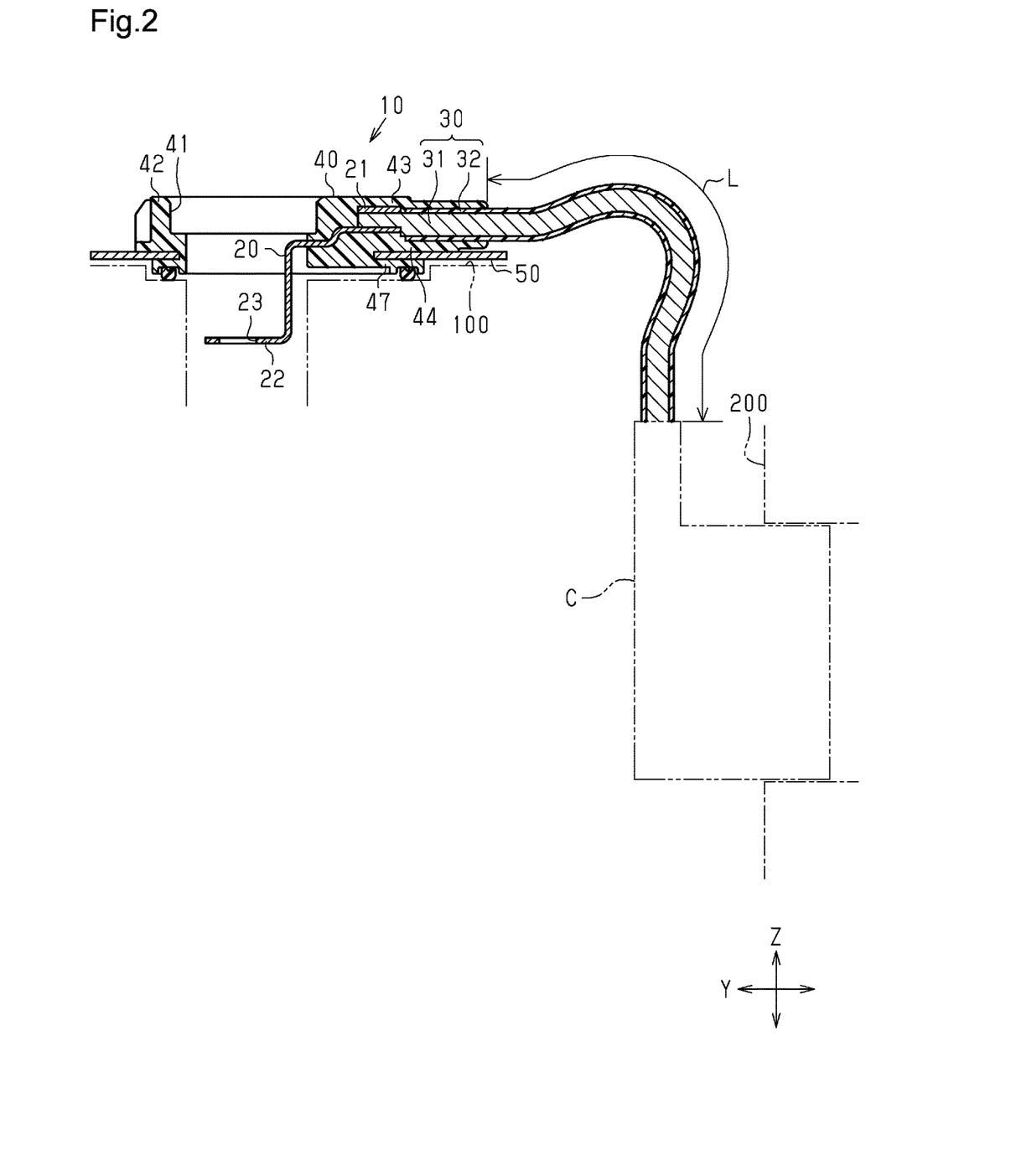
FIG. 2 is a cross-sectional view taken along line 2-2 in FIG. 1.

As shown in FIGS. 1 and 2, the wire harness 10, for example, electrically connects vehicle devices, such as a motor and an inverter, to each other. The wire harness 10 is attached to a case 100 of a device having an opening.

The wire harness 10 includes terminals 20 arranged next to one another, electric wires 30 respectively connected to the terminals 20, a housing 40 holding the terminals 20 and the electric wires 30, and a plate 50 integrated with the housing 40. The wire harness 10 includes, for example, six terminals 20 and six electric wires 30.

Hereinafter, the direction in which the terminals 20 are arranged next to one another will be referred to as the X-axis direction, the direction in which the wires 30 extend inside the housing 40 will be referred to as the Y-axis direction, and the direction orthogonal to both the X-axis direction and the Y-axis direction will be referred to as the Z-axis direction. The X-axis direction, the Y-axis direction, and the Z-axis direction are orthogonal to one another.

Structure of Terminal 20

As shown in FIG. 2, each terminal 20 includes a wire connection portion 21 and a terminal connection portion 22. Each terminal 20 is a single component integrating the wire connection portion 21 and the terminal connection portion 22. The material of the terminal 20 may be a metal material such as an iron-based material, a copper-based material, or an aluminum-based material.

An electric wire 30 is electrically connected to each wire connection portion 21. The electric wire connection portion 21 is, for example, crimped to the electric wire 30.

The terminal connection portion 22 has, for example, the form of a plate. The terminal connection portion 22 is, for example, bent to extend in the Y-axis direction and Z-axis. The distal end of the terminal connection portion 22 is located outside the housing 40. Each terminal connection portion 22 is electrically connected to a corresponding mating terminal arranged inside the case 100 (not shown). An insertion hole 23 extends through the terminal connection portion 22 in the Z-axis direction. The terminal connection portion 22 and the mating terminal are fastened by a bolt (not shown) inserted into the insertion hole 23.

Structure of Electric Wire 30

The electric wire 30 includes a wire core 31 and an insulating coating 32 that coats the outer surface of the wire core 31.

The wire core 31 is, for example, a stranded wire formed by twisting metal wires. The wire core 31 may have a cross section, orthogonal to the longitudinal direction of the wire core 31, of any shape. The cross section of the wire core 31 may have, for example, a circular shape, a semicircular shape, a polygonal shape, a square shape, or a low-profile shape. The wire core 31 in the present embodiment has a circular cross section. The cross-sectional area of the wire core 31 in a cross section orthogonal to the longitudinal direction is, for example, 8 square mm or greater and 20 square mm or less.

The wire core 31 is exposed from the insulating coating 32 at an end of the electric wire 30. The wire core 31 exposed from the insulating coating 32 is connected to the wire connection portion 21 of the terminal 20.

A connector C is attached to an end of the electric wire 30 that is opposite to the end of the electric wire 30 held by the housing 40. The connector C is attached to a case 200 of a device other than the device described above.

The electric wire 30, for example, extends from the housing 40 in the Y-axis direction and is bent toward one side in the Z-axis direction. In the present embodiment, the one side in the Z-axis direction, is the side directed from a first part 44 toward a second part 47, which will be described below, in the Z-axis direction. The portion of each electric wire 30a portion extending outward from the housing 40 has a length L set to, for example, 30 mm or greater and 100 mm or less. The length L of the wire 30 in the present embodiment is set to, for example, 60 mm or greater and 70 mm or less. The length L of the electric wire 30 is the length of a portion of the electric wire 30 that is exposed from both the housing 40 and the connector C.

Structure of Housing 40

Figure 3:
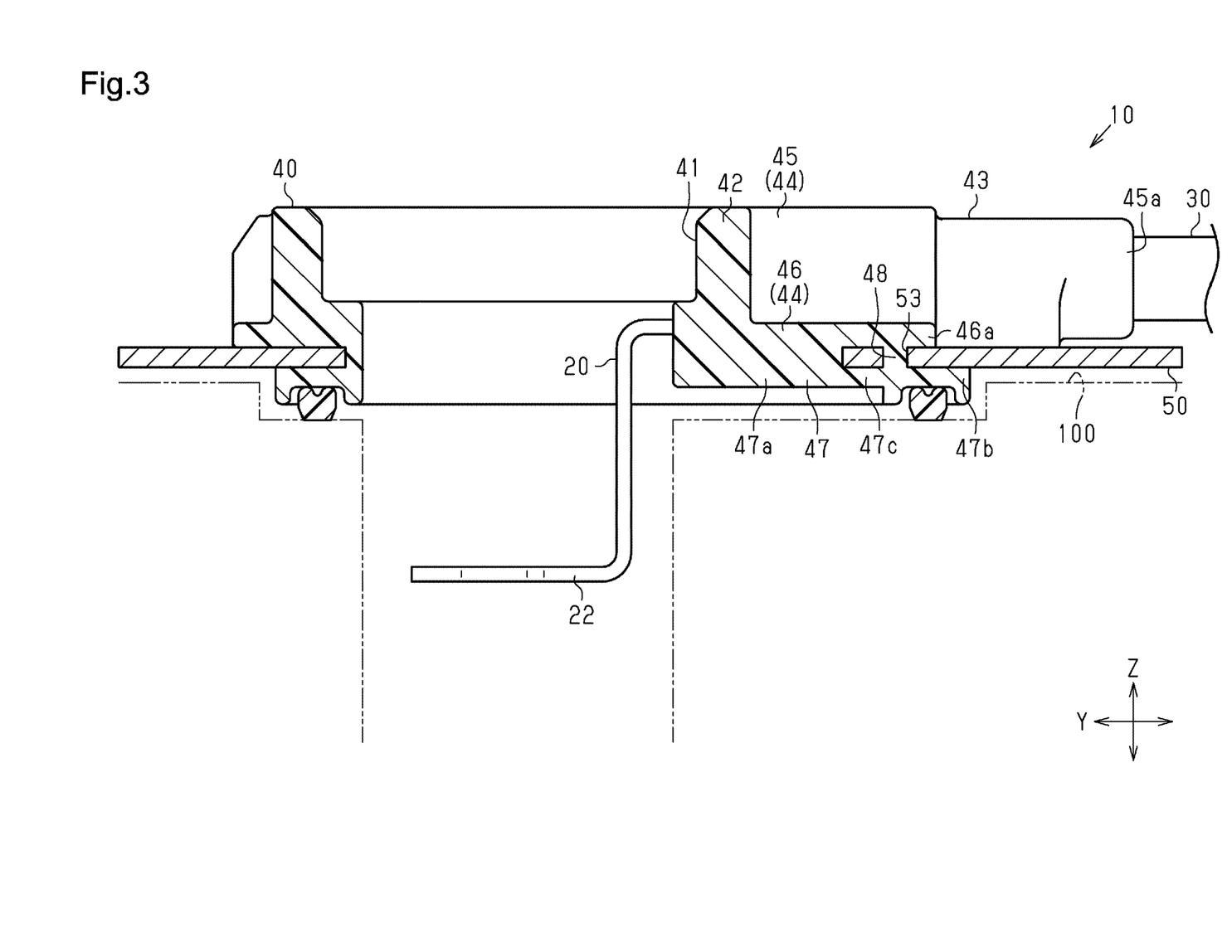
FIG. 3 is a cross-sectional view taken along line 3-3 in FIG. 1.

As shown in FIGS. 1 to 3, the housing 40 includes a tubular hood 42 and a holder 43 projecting out of the hood 42 from the outer surface of the hood. The material of the housing 40 may be, for example, a resin material such as polybutylene terephthalate (PBT).

The hood 42 includes an opening 41 in which the terminals 20 are exposed. The opening 41 extends through the hood 42 in the Z-axis direction. The opening 41 is oval and elongated in the X-axis direction.

The holder 43 projects from the hood 42 toward one side in the Y-axis direction. The holder 43 holds the terminals 20 and the electric wires 30. The terminals 20, the electric wires 30, and the housing 40 are integrated through insert molding. Therefore, the terminals 20 and the wires 30 are partially embedded in the housing 40. Each electric wire 30 extends out from the holder 43 toward one side in the Y-axis direction.

The holder 43 includes a first part 44 located on one side of the plate 50 in the thickness direction and incorporating the electric wires 30. The holder 43 includes a second part 47 located on the side of the plate 50 opposite to the one side in the thickness direction. The plate 50 is held between the first part 44 and the second part 47 in the Z-axis direction.

The first part 44 includes electric wire holders 45 respectively incorporating and holding the electric wires 30, and extending portions 46 project from the hood 42 toward one side in the Y-axis direction. Each of the extending portions 46 connects two adjacent ones of electric wire holders 45 in the X-axis direction. The first part 44 includes, for example, six electric wire holders 45 and five extending portions 46.

As shown in FIG. 3, the projection amount of the extending portion 46 from the hood 42 is less than the projection amount of the electric wire holders 45 from the hood 42. More specifically, a distal end 46a of the extending portion 46 is located closer to the hood 42 in the Y-axis direction than a distal end 45a of the electric wire holder 45 is to the hood 42.

The thickness of the extending portion 46 in the Z-axis direction is less than the thickness of the electric wire holder 45 in the Z-axis direction.

The second part 47 includes a basal end 47a and a distal end 47b, in the projecting direction of the holder 43, and an intermediate portion 47c, located between the basal end 47a and the distal end 47b. The basal end 47a is connected to the hood 42. The distance from the basal end 47a to the distal end 47b is, for example, the same throughout in the X-axis direction.

The projected amount of the second part 47 from the hood 42 is greater than the projected amount of the extending portion 46 from the hood 42 and less than the projected amount of the electric wire holder 45 from the hood 42. More specifically, the distal end 47b of the second part 47 is located farther from the hood 42 in the Y-axis direction than the distal end 46a of the extending portion 46. In addition, the distal end 47b of the second part 47 is provided at a position closer to the hood 42 in the Y-axis direction than the distal end 45a of the electric wire holder 45.

Figure 4:
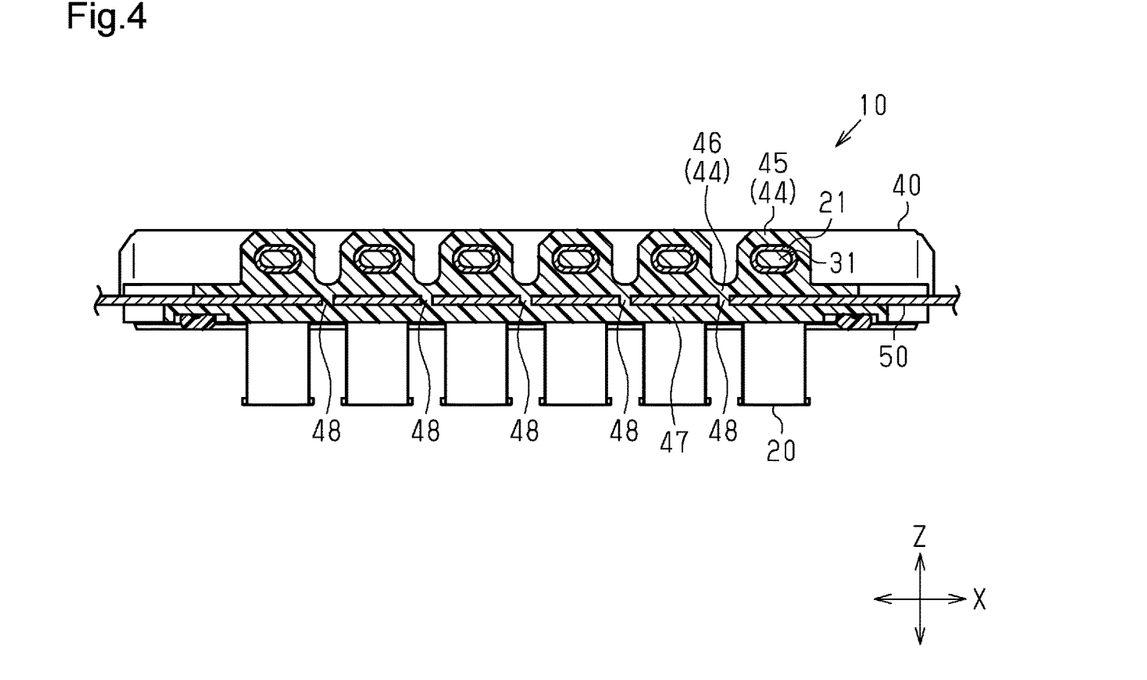
FIG. 4 is a cross-sectional view taken along line 4-4 in FIG. 1.

As shown in FIGS. 3 and 4, the holder 43 includes connecting portions 48 that connect the extending portions 46 of the first part 44 to the second part 47. The connecting portions 48 are spaced apart from each other in the X-axis direction. The holder 43 includes, for example, five connecting portions 48. The connecting portions 48 are located closer to the distal end 47b than the intermediate portion 47c in the Y-axis direction. In other words, the connecting portions 48 are located between the intermediate portion 47c and the distal end 47b in the Y-axis direction.

The connecting portions 48 extend through holes 53 in the plate 50, which will be described below. The connecting portions 48 extend in the Z-axis direction. Each connecting portion 48 has a cross section orthogonal to the Z-axis direction that is, for example, circular.

Structure of Plate 50

Figure 5:
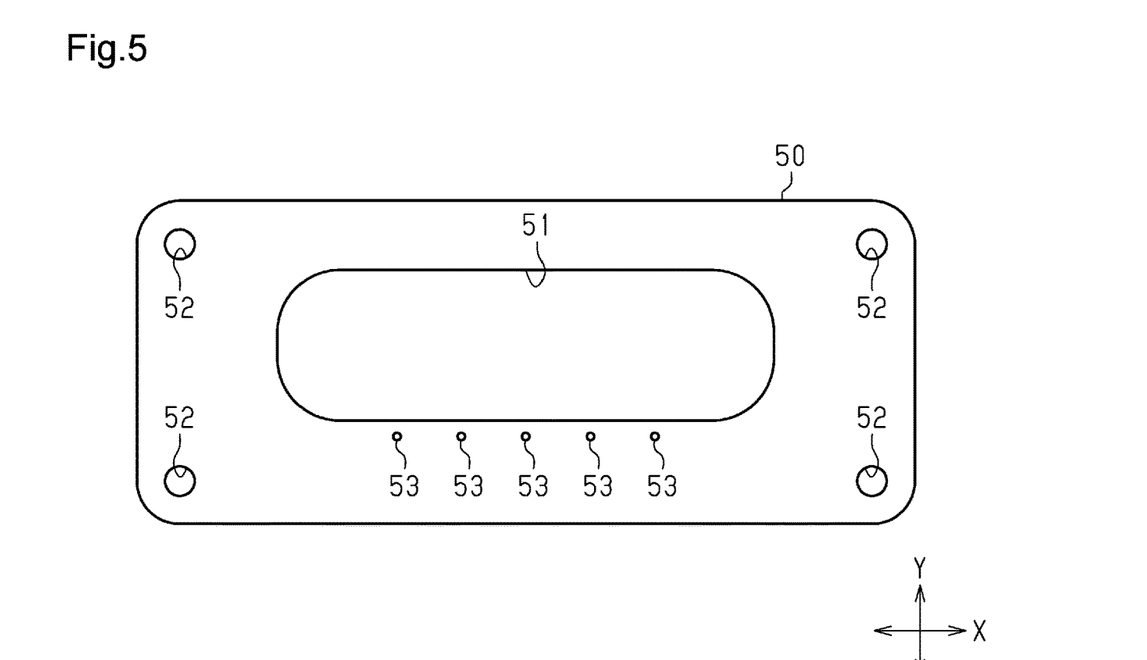
FIG. 5 is a plan view of a plate in the embodiment.

As shown in FIG. 5, the plate 50 projects out of the housing 40 from the outer surface of the hood 42. The plate 50 is elongated in the X-axis direction. The material of the plate 50 may be a metal material such as an iron-based material. The plate 50 and the housing 40 are integrated through insert molding. Therefore, the plate 50 is partially embedded in the housing 40.

The plate 50 includes an insertion hole 51 for insertion of the housing 40. The insertion hole 51 extends through the plate 50 in the Z-axis direction. The insertion hole 51 is, for example, oval and elongated in the X-axis direction. The edge around the insertion hole 51 is held between the first part 44 and the second part 47 of the housing 40.

The plate 50 includes attaching holes 52 into which bolts (not shown) are inserted to attach the plate 50 to the case 100. The attaching holes 52 extend through the plate 50 in the Z-axis direction. The plate 50 is attached to the case 100 to attach the wire harness 10 to the case 100.

Holes 53 extend through the plate 50 in the thickness direction, or the Z-axis direction. The holes 53 are provided in a portion of the plate 50 held between the first part 44 and the second part 47 of the housing 40. The holes 53 are spaced apart from each other in the X-axis direction. The plate 50 includes, for example, five holes 53. Each hole 53 has a cross section orthogonal to the Z-axis direction that is, for example, circular. The connecting portions 48 are inserted into the holes 53. The holes 53 correspond to pass-through portions in "Description of Embodiments of the Present Disclosure".

When insert-molding the plate 50 using the housing 40 as an insert, the holes 53 are filled with the resin material of the housing 40. This forms the connecting portions 48 that extending through the holes 53.

The operation of the embodiment will now be described.

In the wire harness 10, the electric wires 30 are laid out extending from the housing 40 toward one side in the Y-axis direction and bent toward one side in the Z-axis direction. Such a layout produces a reaction force acting on each electric wire 30 to return the electric wire 30 to its original shape. Namely, the reaction force acts on the electric wire 30 toward the side opposite to the one side in the Z-axis direction. Such a reaction force tends to increase as the cross-sectional area of the wire core 31 increases. In particular, when the cross-sectional area of the wire core 31 is 16 square mm or greater, the reaction force becomes outstanding.

According to the present embodiment of the wire harness 10, the connecting portions 48 of the holder 43 connect the first part 44 and the second part 47, which hold the plate 50 of the holder 43. This avoids the formation of a gap between the first part 44 and the plate 50 if a load such as the reaction force described above acts on the first part 44 when laying out the electric wires 30.

The advantages of the embodiment will now be described.

(1) The wire harness 10 includes the terminals 20 arranged next to one another, the electric wires 30 respectively connected to the terminals 20, the housing 40 holding the terminals 20 and the electric wires 30, and the plate 50 projecting from the housing 40. The plate 50 is partially embedded in the housing 40. The hole 53 extends through the plate 50 in the thickness direction of the plate 50. The holder 43 includes the first part 44 located at one side of the plate 50 and incorporating the electric wires 30, the second part 47 located at a side of the plate 50 opposite to the one side, and the connecting portions 48 extending through the holes 53 and connecting the first part 44 and the second part 47.

Such a structure increases the degree of freedom for the layout of the electric wires 30.

(2) The plate 50 includes the holes 53 spaced apart from each other in the X-axis direction. The holder 43 includes the connecting portions 48 spaced apart from each other in the X-axis direction.

With such a structure, the connecting portions 48 and the holes 53 are spaced apart from each other in the X-axis direction. This avoids the formation of a gap between the first part 44 of the holder 43 and the plate 50 over a wide area.

(3) The connecting portions 48 are located closer to the distal end 47b than the intermediate portion 47c.

A load acting on the first part 44 of the holder 43 when laying out the electric wires 30 will tend to be concentrated to a distal end side in the projecting direction of the holder 43. Thus, a gap will be easily formed at the distal end of the first part 44 between the distal end and the plate 50.

In this regard, with the structure described above, the connecting portions 48 are located closer to the distal end 47b than the intermediate portion 47c of the second part 47. More specifically, the first part 44 and the second part 47 are connected to each other by the connecting portions 48 in a distal end side in the projecting direction of the holder 43. The connecting portions 48 can be located close to the distal ends 46a of the extending portions 46 in the first part 44 by increasing the length from the basal end 47a of the second part 47 to the distal end 47b. This avoids the shortcomings described above. Thus, the degree of freedom for the layout of the electric wires 30 can be further increased.

(4) The length L of the portion of each electric wire 30 extending outward from the holder 43 is 30 mm or greater and 100 mm or less.

This structure allows the wire harness 10 to connect devices that are arranged close to each other.

When the length L of the electric wire 30 is less than 30 mm, the wire harness 10 will be difficult to lay out. When the length L of the electric wire 30 is greater than the 100 mm, the reaction force produced by the electric wire 30 is less likely to act on the housing 40 and thus will not be problematic. Therefore, a situation in which the length L of the electrical wire 30 is 30 mm or greater and 100 mm or less is problematic. For such a case, the wire harness 10 of the present embodiment effectively increases the degree of freedom for the layout of the electric wires 30 with the connecting portions 48.

Modified Example

The present embodiment can be modified and practiced as described below. The present embodiment and the following modified examples can be implemented in combination with each other as long as there is no technical contradiction.

The cross-sectional shapes of the connecting portion 48 and the hole 53 may be changed. The cross-sectional shape of the connecting portion 48 and the hole 53 may be, for example, oval or polygonal.

The layout of the electric wires 30 can be changed. The electric wires 30, for example, may extend from the housing 40 toward one side in the Y-axis direction, be bent to extend from the second part 47 toward the first part 44 in the Z-axis direction.

The length L of the electric wire 30 may be less than 30 mm or greater than 100 mm.

The position of each connecting portion 48 in the Y-axis direction can be changed. The connecting portion 48, for example, may be located closer to the basal end 47a than the intermediate portion 47c in the Y-axis direction.

The numbers of the connecting portions 48 and the holes 53 can be changed. There may be, for example, one connecting portion 48 and one hole 5.

The connecting portions 48 of the present embodiment connect the extending portions 46 to the second part 47. Instead, the connecting portions 48 may connect the electric wire holder 45 to the second part 47. In this case, preferably, the connecting portions 48 are located close to the distal end 45a of the electric wire holder 45, by appropriately setting the length from the basal end 47a of the second part 47 to the distal end 47b of the second part 47.

Instead of the holes 53, the plate 50 may include slots serving as the pass-through portions that extend through the plate 50 in the thickness direction. The slots can be located, for example, in the edge around the insertion hole 51. Such a structure will have the advantages of the embodiment described above. When the plate 50 includes the holes 53, the plate 50 will be more rigid than when the plate 50 includes slots.

As shown in FIG. 5, the insertion hole 51 of the plate 50 may be an oval including a major axis and a minor axis. The plate 50 may include two long sides extending along the major axis of the insertion hole 51. The pass-through portions (holes) 53 of the plate 50 may be arranged in a line located adjacent to one of two long inner edges of the insertion hole 51 than one long side of the plate 50.

As shown in FIG. 1, a gap may be formed between the hood 42 and one of the two long inner edges of the insertion hole 51. The pass-through portions (holes) 53 formed adjacent to one long inner edge of the insertion hole 51 will allow resin to flow more smoothly during molding on two surfaces of the plate 50 and into the pass-through portions (holes 53) than when the pass-through portions (holes) 53 formed adjacent to one long side of the plate 50 and the long inner edge of the insertion hole 51 is embedded in the hood 42.

As shown in FIGS. 2 to 4, the hood 42 and the holder 43 may include a seal groove for accommodating a seal member that contacts the case 100. As shown in FIG. 3, the pass-through portions (holes) 53 of the plate 50 may be formed between the seal groove of the holder 43 and one long inner edge of the insertion hole 51.

This allows resin to flow more smoothly during molding on the two surfaces of the plate 50 and into the pass-through portions (holes) 53 than when the pass-through portions (holes) 53 formed adjacent to one long side of the plate 50 and one long inner edge of the insertion hole 51 is embedded in the hood 42 and the seal groove is formed at a location adjacent to the long inner edge of the insertion hole 51 in the hood 42.

As shown in FIGS. 1 and 4, the pass-through portions (holes) 53 of the plate 50 may be formed at a position corresponding to a position between adjacent wire connection portions 21.

REFERENCE SIGNS LIST

C . . . connector
L . . . length
10 . . . wire harness
20 . . . terminal
21 . . . wire connection portion
22 . . . terminal connection portion
23 . . . insertion hole
30 . . . electric wire
31 . . . wire core
32 . . . insulating coating
40 . . . housing
41 . . . opening
42 . . . hood
43 . . . holder
44 . . . first part
45 . . . electric wire holder
45a . . . distal end
46 . . . extending portion
46a . . . distal end
47 . . . second part
47a . . . basal end
47b . . . distal end
47c . . . intermediate portion
48 . . . connecting portion
50 . . . plate
51 . . . insertion hole
52 . . . attaching hole
53 . . . hole
100 . . . case
200 . . . case

The invention claimed is:

1. A wire harness, comprising:
   terminals arranged next to each other;
   electric wires respectively connected to the terminals;
   a resin housing including a hood and a holder, the hood including an opening that exposes the terminals therein, and the holder projecting out of the hood from an outer surface of the hood and holding the terminals and the electric wires; and
   a plate projecting out of the housing from the outer surface of the hood, wherein
   the plate is partially embedded in the housing,
   the plate includes pass-through portions extending through the plate in a thickness direction of the plate,
   the pass-through portions are holes or slots,
   the holder includes a first part located on one side of the plate and incorporating the electric wires, a second part located on a side of the plate opposite to the one side of the plate, and connecting portions that extend through the pass-through portions and connect the first part and the second part,
   the first part includes tubular electric wire holders extending in parallel from the hood in a projecting direction of the holder, and plate-like extending portions projecting from the hood in the projecting direction and extending between the tubular electric wire holders to interconnect the tubular electric wire holders, wherein the plate-like extending portion is thinner than the tubular electric wire holder,
   the electric wires each include a portion extending out of the holder that is bent in a direction from the first part toward the second part, and
   the pass-through portions are provided only at positions corresponding to respective ones of the plate-like extending portions.

2. The wire harness according to claim 1, wherein:
   when a direction in which the terminals are arranged next to each other is referred to as an arrangement direction;
   the pass-through portion is one of a plurality of pass-through portions of the plate that are spaced apart from each other in the arrangement direction; and
   the connecting portion is one of a plurality of connecting portions of the holder that are spaced apart from each other in the arrangement direction.

3. The wire harness according to claim 1, wherein
   the connecting portion is located closer to a distal end of the second part in the projecting direction than an intermediate portion between a basal end of the second part in the projecting direction and the distal end of the second part.

4. The wire harness according to claim 1, wherein a portion of each of the electric wires extending outward from the holder has a length of 30 mm or greater and 100 mm or less.

5. The wire harness according to claim 1, wherein the pass-through portions are provided only at positions, in each of the plate-like extending portions, corresponding to outer end portions in the projecting direction.

\* \* \* \* \*